Patented Sept. 25, 1951

2,569,415

UNITED STATES PATENT OFFICE 2,569,415

IMIDAZOLINES

Max Hartmann, Riehen, and Siegfried Studer, Basel, Switzerland, assignors to Ciba Pharmaceutical Products, Inc., Summit, N. J.

No Drawing. Application December 13, 1948, Serial No. 65,067. In Switzerland December 24, 1947

8 Claims. (Cl. 260—309.6)

The present invention relates to new 2-[carbazolyl-(9')-alkyl]-imidazolines and their salts of inorganic or organic acids, e. g. of hydrohalic acid, such as hydrochloric acid, and also of sulphuric acid, phosphoric acid, nitric acid, methanesulphonic acid, oxyethane-sulphonic acid, toluene sulphonic acid, acetic acid, or tartaric acid, which have a pharmacological action similar to that of adrenaline.

The benzene nuclei of the carbazole moiety of the 2-[carbazolyl-(9')-alkyl]-imidazolines of the invention may be partially or completely hydrogenated and/or may be unsubstituted or substituted, for example, by alkyl groups such as methyl or ethyl groups; etherified or esterified hydroxyl groups such as alkoxy, aralkoxy or acyloxy groups, for example, methoxy, ethoxy, propyloxy, butyloxy, benzyloxy, acetoxy or benzoyloxy groups, or amino or nitro groups or halogen atoms. Furthermore, the imidazoline residue as well as the alkylene chain may contain substituents, for example, alkyl radicals such as methyl, ethyl or propyl radicals.

The new imidazolines are made by reacting a carbazolyl-(9)-alkane carboxylic acid or a reactive acid derivative thereof with an N-unsubstituted alkylene diamine of which the aminogroups are bound to vicinal carbon atoms, or with a reactive N-derivative thereof.

As reactive derivatives of the acids there may be used, for example, their imido-ethers, imidohalides, thioamides, thioimido-ethers, amides, esters, halides, amidines or nitriles. Instead of starting with the acid derivatives themselves, the process may be conducted in such manner that the derivative is formed in the course of the reaction. If the nitriles are reacted directly with the alkylene diamines, the reaction is best carried out in the presence of hydrogen sulphide or agents yielding hydrogen sulphide, such as carbon disulphide. In the reaction of the nitriles with the alkylene diamine the latter may be used in the form of their mono-salts. The reactive N-derivatives of alkylene diamines to be used in the process of the invention are those which react with the formation of imidazolines. The reaction of ethylene urea, for instance, yields compounds whose imidazoline ring nitrogen is not substituted. However, one of the nitrogen atoms may carry a substituent which is not split off in the reaction, for example, an alkyl residue, such as a methyl-, ethyl- or propyl residue. The conditions of the reaction vary according to the starting materials used. Thus, the reaction may be carried out in the presence or absence of a diluent and/or a condensing agent, at a lower or higher temperature and at various pressures. Furthermore, one of the reaction components may be used in excess. The process may also be carried out in stages, for example, by first forming the acyl derivative of the alkylene diamine and then heating it with an agent capable of splitting off water, for instance, calcium oxide.

Those of the starting materials which are not described in the literature can be prepared by known methods.

The products of the invention may find application as medicaments. The new compounds, which have been tested pharmacologically, exhibit an action similar to that of adrenalin. Thus, 2-[1', 2', 3', 4'-tetrahydrocarbazolyl-(9')-methyl] - imidazoline, 2-[3'-methyl - carbazolyl-(9')-methyl]-imidazoline, and 2-[3'-chloro-carbazolyl - (9') - methyl] - imidazoline, and salts thereof, give rise to an increase in blood pressure and a constriction of the peripheral blood vessels to a substantially greater extent than in the case of adrenalin.

The following examples illustrate the invention, the parts being by weight unless otherwise stated, and the relationship of parts by weight to parts by volume being the same as that of the gram to the cubic centimeter:

Example 1

A warm solution of 45 parts of carbazolyl-(9)-acetic acid and 16 parts of ethylene diamine hydrate in 300 parts of alcohol is mixed, while stirring, with one equivalent of an ethanolic solution of hydrochloric acid, and the whole is slowly heated to about 230° C. After distilling off the ethanol, the whole is stirred for ½ hour at the same temperature, 28.4 parts of phosphorus pentoxide are then added to the melt, and the temperature is maintained for a further 1½ hours at about 230° C. After cooling, the dark mass is pulverized and exhaustively extracted with hot water. From the filtered aqueous solution 2-[carbazolyl-(9')-methyl]-imidazoline of the formula

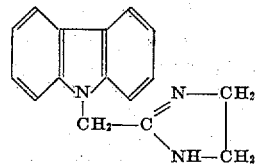

is precipitated in the form of a white crystalline powder by means of a concentrated aqueous solution of caustic soda; it melts at 232–234° C. after recrystallization from ethanol. It forms a hydrochloride melting at 270–272° C.

Example 2

25.73 parts of 1,2,3,4-tetrahydrocarbazolyl-(9)-acetic acid ethyl ester, 6.0 parts of ethylene diamine and 50 parts by volume of ethanol are heated to 220–230° C. in the course of one hour, while stirring. The whole is stirred for a further hour at that temperature while 40 parts of ethylene diamine are introduced dropwise. 14.2 parts of phosphorus pentoxide are then added to the reaction mass, and the whole is stirred for a further hour at 230° C. After cooling, the reaction product is worked up in the manner described in Example 1. The resulting 2-[1',2',3',4'-tetrahydro-carbazolyl - (9') - methyl]-imidazoline of the formula

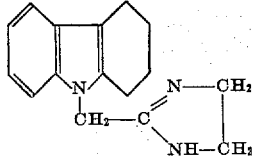

crystallizes from ethyl acetate in the form of colorless needles and melts at 180–181° C. The hydrochloride decomposes at 275–277.5° C.

Example 3

A solution of 20.7 parts of 9-cyanmethyl-carbazoline (boiling at 139–140° C. under 0.1 mm. pressure, and obtained by the reaction of carbazoline with trioxymethylene and aqueous potassium cyanide solution in glacial acetic acid at between 5° C. and 10° C. and subsequently stirring for 20 hours at room temperature) and 6.9 parts of ethylene diamine in 60 parts by volume of toluene is boiled for 5 hours in a reflux apparatus while introducing hydrogen sulphide. After distilling off the solvent, finally under reduced pressure, the residue is dissolved in 125 parts by volume of methylene chloride. The solution is introduced, while stirring, into 200 parts by volume of 0.5N hydrochloric acid and the methylene chloride is separated. 2-[carbazolinyl-(9')-methyl]-imidazoline of the formula

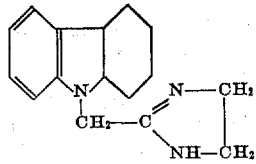

is precipitated from the aqueous solution in the form of a white crystalline powder by means of caustic soda solution. The product melts at 132–133° C. after recrystallization from dilute ethanol. Its hydrochloride melts at 210–211° C. (with decomposition) after being recrystallized twice from a mixture of methanol and ether.

Example 4

A solution of 22 parts of 9-(β-cyanethyl)-carbazole and 6.6 parts of ethylene diamine in 150 parts by volume of xylene is heated, after the introduction of 1 part of hydrogen sulphide, for 4 hours in a bomb tube at 110–120° C. After cooling, the partially crystallized contents of the tube are poured into 250 parts by volume of 0.5N hydrochloric acid. After removing the xylene, the 2-[carbazolyl-(9')-ethyl]-imidazoline of the formula

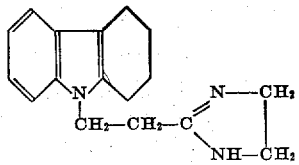

may be isolated in the manner described in Example 1. Its hydrochloride melts at 253° C. after recrystallization from a mixture of ethanol and ether.

Example 5

2-[1',2',3',4'-tetrahydrocarbazolyl-(9')-ethyl]-imidazoline of the formula

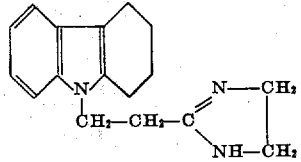

is prepared from 22.4 parts of 9-(β-cyanethyl)-tetrahydrocarbazole by the method described in Example 4. Its hydrochloride melts at 213–215° C. after being recrystallized twice from a mixture of ethanol and ether.

Example 6

22.0 parts of 3-methyl-9-cyanmethyl-carbazole, having a melting point of 141–142° C., are refluxed for 50 minutes at a bath temperature of about 150° C. with 6.6 parts of dry ethylene diamine while introducing a stream of hydrogen sulphide. The reaction product, which crystallizes on cooling, is dissolved in 150 parts by volume of methylene chloride, the solution extracted with 350 parts by volume of 0.5N hydrochloric acid and the methylene chloride separated. When the hydrochloric acid extract is made alkaline with concentrated aqueous ammonia, 2-[3'-methyl-carbazolyl-(9')-methyl] - imidazoline of the formula

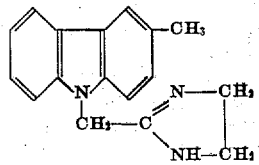

is precipitated as a white crystalline powder. Upon repeated recrystallization from ethanol and ethyl acetate-petroleum ether and sublimation in high vacuum, it melts at 171–172.5° C. The melting point of the hydrochloride, after recrystallization from methanol-acetone-ether, lies at 271–273° C.

Example 7

17.0 parts of 3-methoxy-9-cyanmethyl-carbazole having a melting point of 116–117° C., are refluxed for 1 hour at a bath temperature of 220° C. with 16.3 parts of 2-amino-ethylammonium-p-toluene-sulfonate. The crystallized reaction product is dissolved in dilute ethanol, the solution made alkaline to phenolphthalein by means of 5N caustic soda and the precipitated crystalline powder dissolved in methylene chloride. After drying the solution over potash and evaporating the methylene chloride, there are obtained 17.85 parts (91.3% of the theory) of crude 2-[3'-methoxy-carbazolyl - (9') - methyl]-imidazoline of the formula

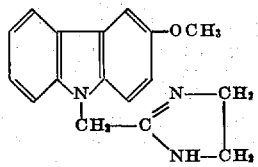

which melts at 182–183° C. after distillation in high vacuum and recrystallization from ethanol. The melting point of the hydrochloride after recrystallization from methanol-acetone-ether is at 227–228° C.

Example 8

25.0 parts of 3-ethoxy-9-cyanmethyl-carbazole (melting point of 95–97° C.) and 23.2 parts of 2-aminoethylammonium-p-toluene-sulfonate are refluxed for 1 hour at 180–200° C. The reaction product is worked up in the manner described in Example 7. There is obtained an excellent yield of 2-[3'-ethoxy-carbazolyl-(9')-methyl]-imidazoline of the formula

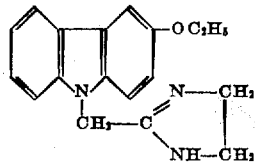

which, after distillation in high vacuum and recrystallization from ethyl acetate, melts at 164–165° C.; its hydrochloride has, after recrystallization from acetone-ether, a melting point of 242–242.5° C.

Example 9

13.5 parts of 3-phenoxy-9-cyanmethyl-carbazole (melting point of 105–106° C.) are heated to 170° C. for 50 minutes with 10.5 parts of 2-aminoethylammonium - p - toluene - sulphonate. The crude 2-[3'-phenoxy-carbazolyl-(9')-methyl]-imidazoline of the formula

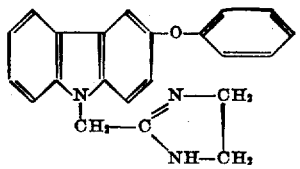

is isolated in the manner described in Example 7. After distillation in high vacuum and recrystallization from ethylacetate-petroleum ether, it melts at 172.5–173.5° C. After recrystallization from methanol-ether, its hydrochloride melts at 271–272° C.

Example 10

12.0 parts of 3-chloro-9-cyanmethyl-carbazole, having a melting point of 150–150.5° C., and 12.0 parts of 2-aminoethylammonium-p-toluene-sulphonate are heated to 180–200° C. for 45 minutes. The obtained 2-[3'-chloro-carbazolyl-(9')-methyl]-imidazoline of the formula

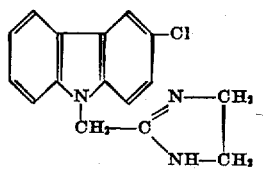

isolated in the manner described in Example 7, melts at 213–215° C., after recrystallization from ethyl acetate-petroleum ether and sublimation in high vacuum. Its hydrochloride melts at 263–265° C., after recrystallization from methanol-ether.

The 9-cyanmethyl-carbazoles, substituted in 3-position which are used as starting materials in Examples 6–10, may be prepared as follows:

By the condensation of 2-chloro-cyclohexanone with anilines substituted in 4-position, there are obtained the 5,6,7,8-tetrahydrocarbazoles which are substituted in 3-position. 3-phenoxy-tetrahydrocarbazole is not described in the literature; it boils at 209–210° C., under a pressure of 0.1 mm. of mercury, and melts at 141–143° C.

From the 5,6,7,8-tetrahydrocarbazoles, the following carbazolines substituted in 3-position may be obtained for example by reduction with tin and concentrated hydrochloric acid in ethanolic solution:

3-methyl-carbazoline, B. P.$_{0.5}$ 114–115° C.
3-methoxy-carbazoline, B. P.$_{0.4}$ 128–129° C.
3-ethoxy-carbazoline, B. P.$_{0.18}$ 132–134° C.
3-phenoxy-carbazoline, B. P.$_{0.2}$ 196–198° C.
3-chloro-carbazoline, B. P.$_{0.38}$ 134°; M. P. 62–64° C.

By reacting these carbazolines with trioxymethylene and aqueous potassium cyanide solution in glacial acetic acid at between 5 and 10° C. and then stirring for 20 hours at room temperature, the following substituted 9-cyanmethyl-carbazolines may be prepared:

3-methyl-9-cyanmethyl-carbazoline, B. P.$_{0.32}$ 157–158° C.
3-methoxy-9-cyanmethyl-carbazoline, M. P. 107–108° C.
3-ethoxy-9-cyanmethyl-carbazoline, M. P. 102.5–103.5° C.
3-phenoxy-9-cyanmethyl-carboazoline, M. P. 119.5–120.5° C.
3-chloro-9-cyanmethyl-carbazoline, M. P. 81–82° C.

Upon dehydration with chloranil in boiling xylene, the substituted 9-cyanmethyl-carbazolines are converted into the corresponding 9-cyanmethyl-carbazoles used in the aforesaid examples.

Having thus disclosed the invention, what is claimed is:

1. A compound selected from the group consisting of the 2-[carbazolyl-(9')-alkyl]-imidazolines and the acid salts thereof, the two carbocyclic rings of the carbazole nucleus of the said compound being six-membered monocyclic rings, and at least one of these two six-membered carbocyclic rings being monocyclic aryl.

2. A 2-[carbazolyl-(9')-methyl]-imidazoline wherein at least one of the two six-membered carbocyclic rings of the carbazole nucleus is monocyclic aryl.

3. An acid salt of a 2-[carbazolyl-(9')-methyl]-imidazoline wherein at least one of the two six-membered carbocyclic rings of the carbazole nucleus is monocyclic aryl.

4. 2-[1',2',3',4' - tetrahydrocarbazolyl - (9')-methyl]-imidazoline.

5. 2 - [3' - methyl - carbazolyl - (9') - methyl]-imidazoline.

6. 2 - [3' - chloro - carbazolyl - (9') - methyl]-imidazoline.

7. 2-[carbazolyl-(9')-methyl]-imidazoline.

8. 2 - [3' - chloro - carbazolyl - (9') - methyl]-imidazoline hydrochloride.

MAX HARTMANN.
SIEGFRIED STUDER.

REFERENCES CITED

The following references are of record in the file of this patent:

UNITED STATES PATENTS

| Number | Name | Date |
|---|---|---|
| 2,003,623 | Bockmuhl et al. | June 4, 1935 |

FOREIGN PATENTS

| Number | Country | Date |
|---|---|---|
| 377,255 | Great Britain | July 14, 1932 |

Certificate of Correction

Patent No. 2,569,415 September 25, 1951

MAX HARTMANN ET AL.

It is hereby certified that error appears in the printed specification of the above numbered patent requiring correction as follows:

Column 3, lines 66 to 73, Example 4, for that portion of the formula reading

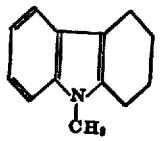  read  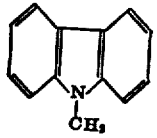

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*